May 22, 1962 G. A. FRANCO ET AL 3,036,157

ORTHOGONAL FUNCTION COMMUNICATION SYSTEM

Filed May 9, 1960

5 Sheets-Sheet 1

INVENTORS.
GEORGE A. FRANCO
BY GERARD LACHS
George J. Seligsohn
ATTORNEY

SIGNAL ENCODER 106

May 22, 1962 G. A. FRANCO ET AL 3,036,157

ORTHOGONAL FUNCTION COMMUNICATION SYSTEM

Filed May 9, 1960 5 Sheets-Sheet 3

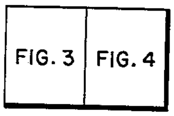
Fig. 5
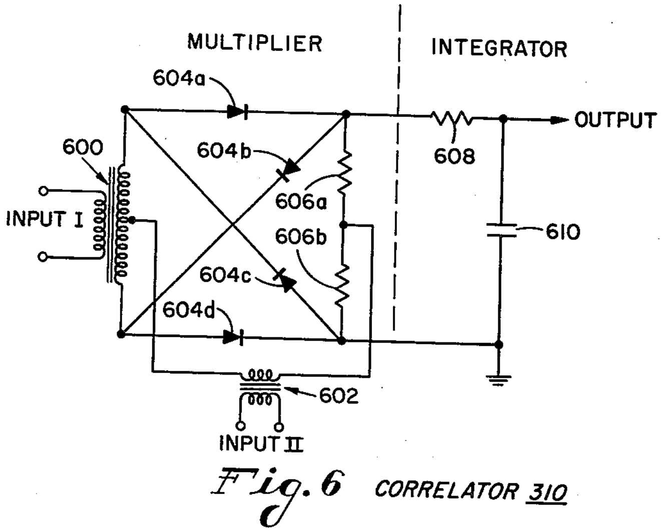
Fig. 6 CORRELATOR 310
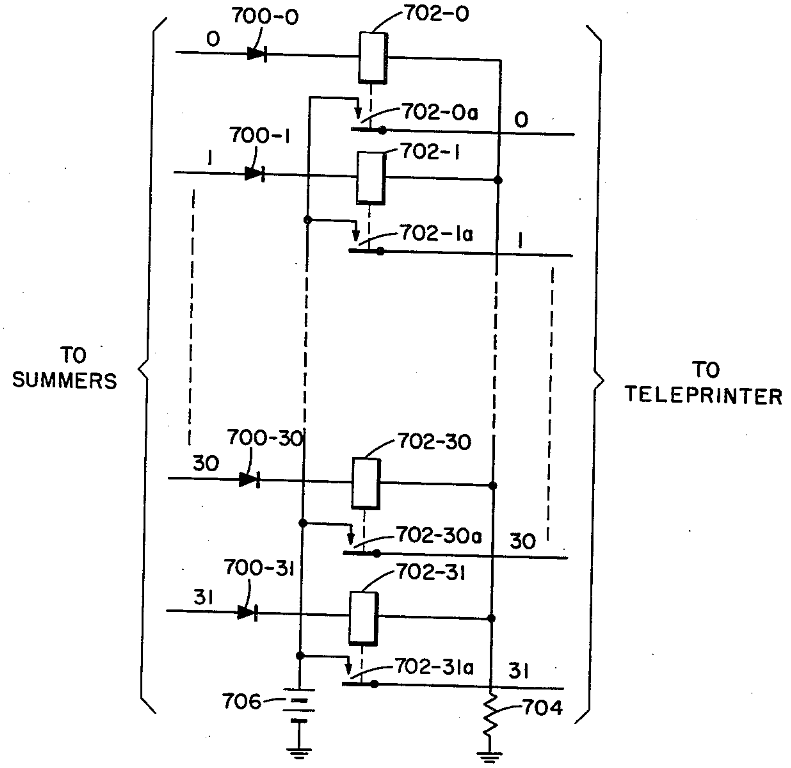
Fig. 7
DECISION CIRCUIT 416

3,036,157

ORTHOGONAL FUNCTION COMMUNICATION SYSTEM

George A. Franco, Pittsford, and Gerard Lachs, Rochester, N.Y., assignors to General Dynamics Corporation, Rochester, N.Y., a corporation of Delaware Filed May 9, 1960, Ser. No. 27,604
18 Claims. (Cl. 178—67)

Figure 1:
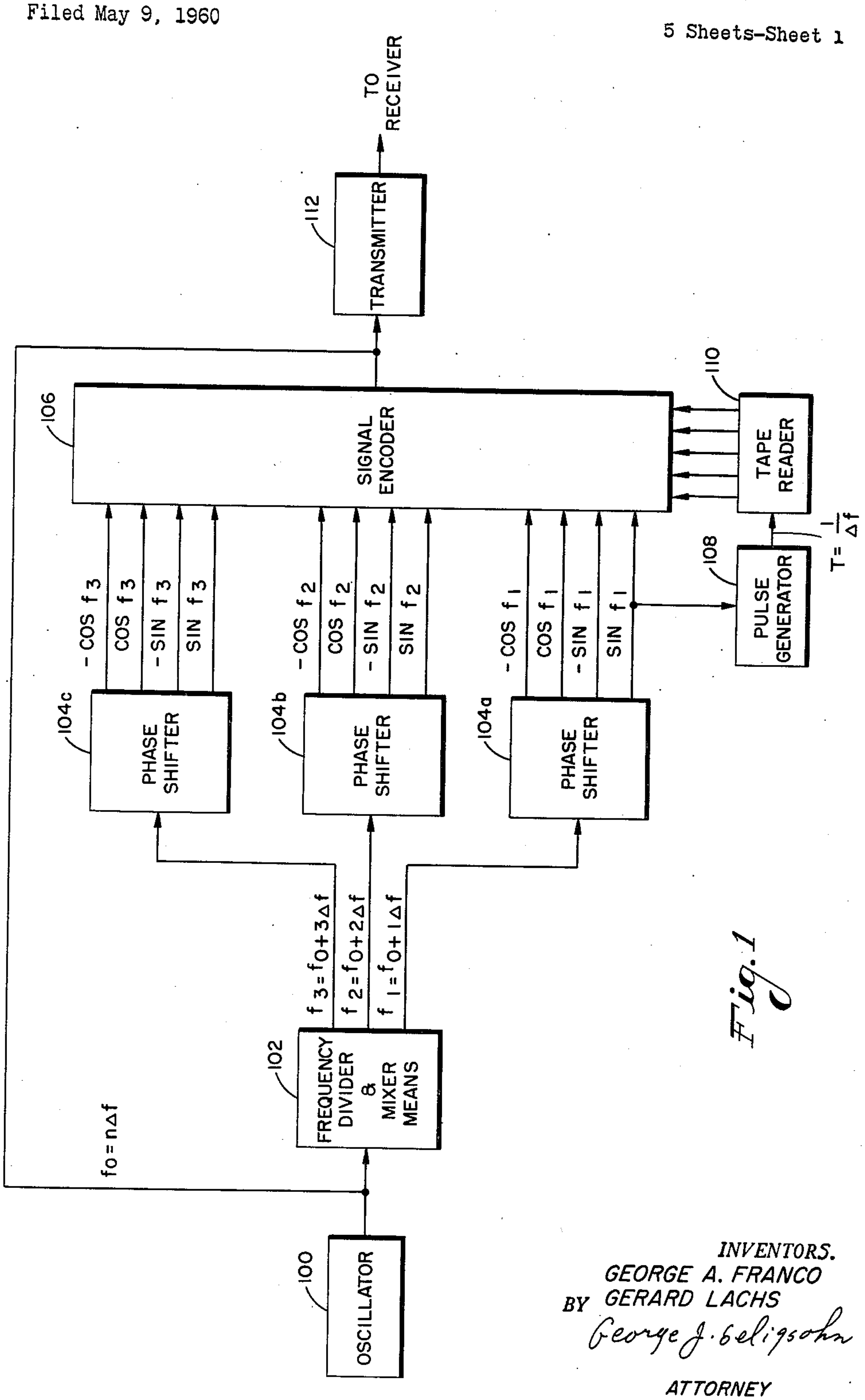

This invention relates to an orthogonal function communication system and, more particularly, to such a system utilizing permuted phase coding for transmitting information.

The merit of any type communication system is based on the amount of information which may be transmitted in a given time with a given chance of error over a given frequency bandwidth, rather than any one of these factors, per se.

For instance, the information handling capacity of a communication system may be increased by simultaneously transmitting a number of pieces of information at a given rate over a plurality of frequency channels. However, this is accomplished by increasing the frequency bandwidth employed. The information handling capacity of the communication system may also be increased by transmitting pieces of information at a higher rate, so that more pieces of information are transmitted in a given time. However, this again increases the frequency bandwidth employed. The error-minimizing capabilities of the system may be improved by redundant transmission of information, i.e., transmitting the same piece of information several times. However, this improvement in the error-minimizing capability of the communication system is achieved at the expense of the amount of information handling capacity.

It has been found that an orthogonal function communication system is capable of transmitting more information in a given time utilizing a given frequency bandwidth with a lower possibility of error than any type of communication system now in existence.

In mathematics, two functions $F_1(t)$ and $F_2(t)$ are called orthogonal in the interval $0 \leqq t \leqq T$, if the integral taken over the product of these functions vanishes. That is, $$(1) \qquad \int_0^T F_1(t)F_2(t)dt=0$$

Although there are many types of orthogonal functions, and it is not intended that this invention be limited to any particular type of orthogonal function, the most familiar orthogonal functions involve sine and cosine functions. For instance, the following types of sine and cosine functions are all orthogonal:

$$(2) \qquad A\int_0^T \pm\sin(2\pi N_1 ft)\pm\cos(2\pi N_2 ft)dt=0$$

where, $A$=constant
$N_1$=any positive integer
$N_2$=any positive integer
$f$=frequency
$t$=time
$T=1/f$ $$(3) \qquad A\int_0^T \pm\sin(2\pi N_1 ft)\pm\sin(2\pi N_2 ft)dt=0$$

where, $A$=constant
$N_1$=any positive integer
$N_2$=any positive integer except $N_1$
$f$=frequency
$t$=time
$T=1/f$ $$(4) \qquad A\int_0^T \pm\cos(2\pi N_1 ft)\pm\cos(2\pi N_2 ft)dt=0$$

where, $A$=constant
$N_1$=any positive integer
$N_2$=any positive integer except $N_1$
$f$=frequency
$t$=time
$T=1/f$ However, the following two types of sine and cosine functions are not orthogonal:

$$(5) \qquad A\int_0^T \pm\sin(2\pi Nft)\pm\sin(2\pi Nft)dt=\pm A/2$$

where, $A$=constant
$N$=any positive integer
$f$=frequency
$t$=time
$T=1/f$ $$(6) \qquad A\int_0^T \pm\cos(2\pi Nft)\pm\cos(2\pi Nft)dt=\pm A/2$$

where, $A$=constant
$N$=any positive integer
$f$=frequency
$t$=time
$T=1/f$

It will be seen that if a product is taken of a first function consisting of a complex wave having as components a unique combination of some of a given number of sine and cosine functions of harmonically related frequencies multiplied by a second function consisting of a single one of the given number of the sine and cosine functions, and this product is integrated over a time interval equal to the period of the fundamental frequency of the harmonically related frequency or a sub-harmonic thereof, an output will be obtained which has a magnitude which is proportional only to the magnitude of that component of the complex wave which is identical to the second function. It is, therefore, possible to obtain the correlation between an unknown complex wave and a known simple wave.

The present invention contemplates providing a code wherein a unique set or combination of orthogonal functions manifests each separate one of a plurality of characters. At a transmitting point all of the orthogonal functions to be used are generated, and in accordance with the particular character to be transmitted, the proper set of orthogonal functions is selected and transmitted to a receiving point. At the receiving point, where the code is known a priori, the received signal is correlated against each of the possible orthogonal functions to determine which particular ones of the othogonal functions are actually contained in the received signal, from which the character which has been transmitted may then be determined.

It will be seen that by using a relatively small number of orthogonal functions and permuting them in different combinations, a code consisting of a very large number of characters may be produced. The total number of possible characters which may be produced by permuting a given number of orthogonal functions in a predetermined manner will be designated herein as the "available" alphabet.

This "available" alphabet may be easily made much larger than the actual number of characters to be transmitted. It is then possible to select a sub-set from the "available" alphabet to manifest the actual characters. Such a selected sub-set will be designated herein as the "real" alphabet.

If, in selecting the "real" alphabet, the combination of orthogonal functions manifesting any actual character is made as different as possible from the respective combinations of orthogonal functions manifesting the other actual characters of the "real" alphabet, great error-minimizing capability can be achieved with very little increase in frequency bandwidth and no increase in transmitting time.

More particularly, this error-minimizing capability is obtained at the receiver by looking at the correlated output obtained and then deciding which one of the actual characters of the "real" alphabet it most closely approximates. Since the codes of the actual characters of the real alphabet were chosen to be as different from each other as possible, even if a character is somewhat garbled during transmission, the chance that it will look more like some other actual character than like the character actually transmitted is extremely remote.

It is, therefore, an object of this invention to provide an improved communication system.

It is a further object of this invention to provide a communication system utilizing orthogonal functions.

It is a still further object of this invention to provide a communication system utilizing permuted phase coding of orthogonal functions.

It is a still further object of this invention to provide a communication system having a high order of error detection and correction capabilities.

It is a still further object of this invention to provide a communication system having a small frequency bandwidth-rate of transmission product.

Figure 2:
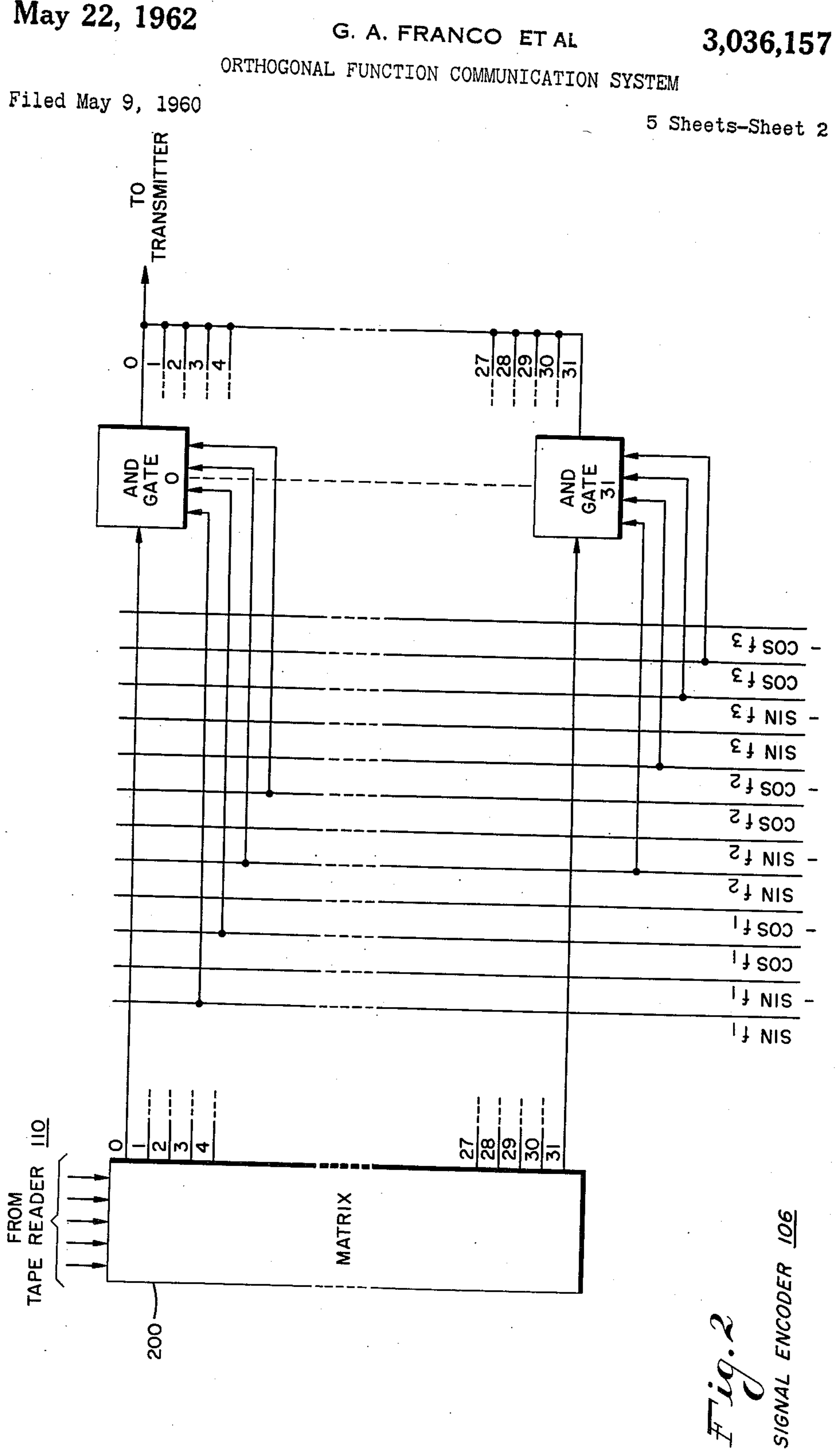
Figure 3:
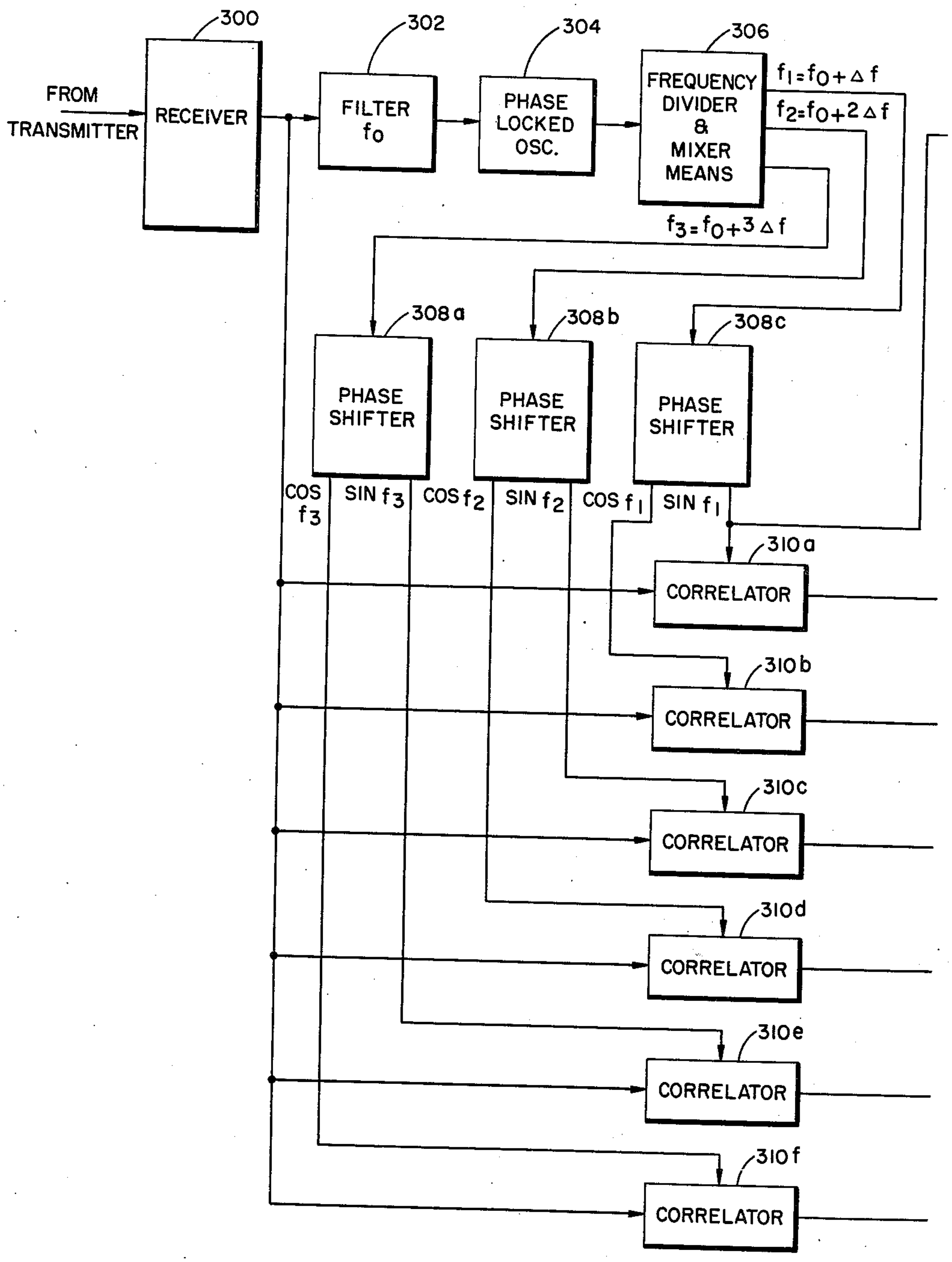
Figure 4:
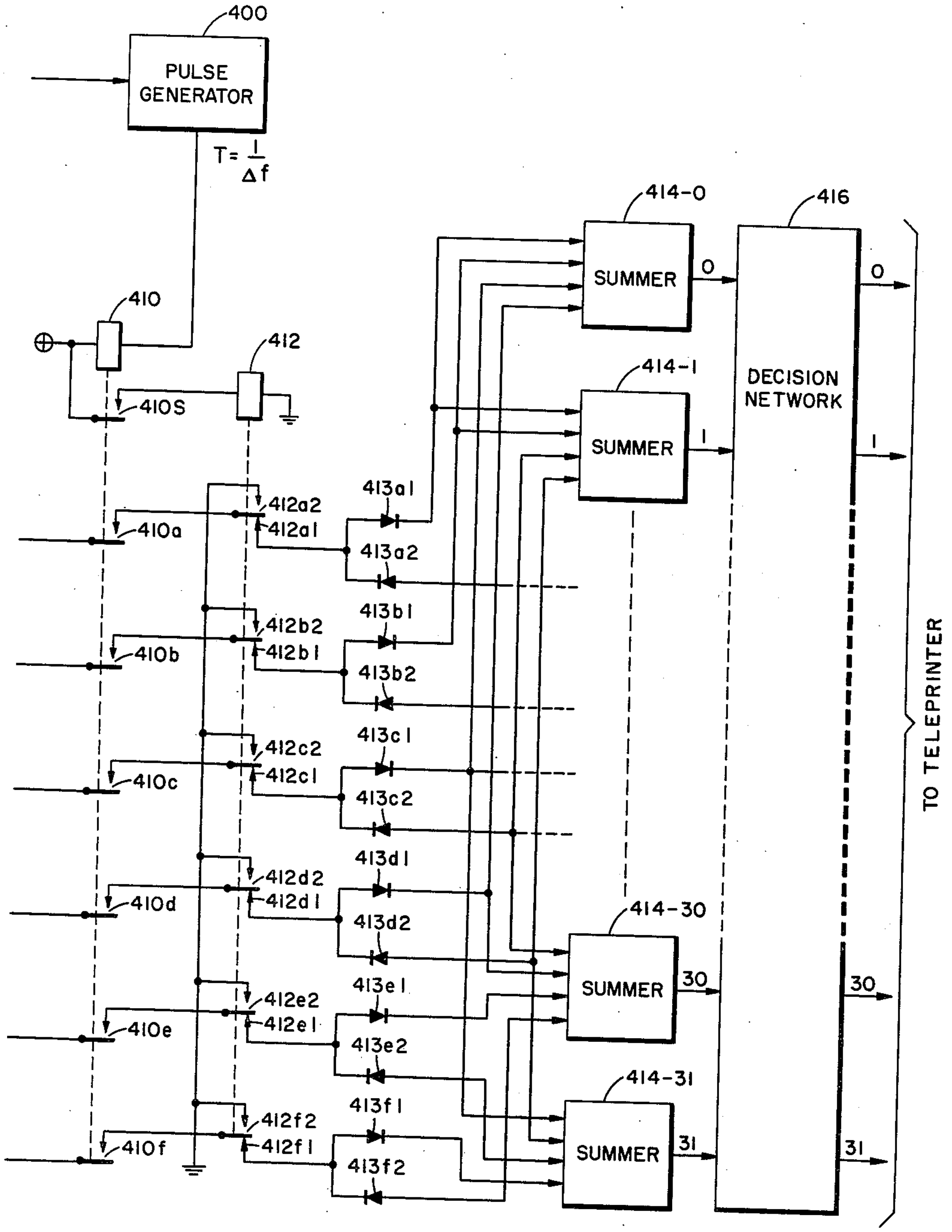

Other objects, features and advantages of the present invention will become more apparent from the following detailed description taken together with the accompanying drawings, in which:

FIG. 1 is a block diagram of that portion of one embodiment of the present invention located at a transmitting point, FIG. 2 is a more detailed showing of the signal encoder of FIG. 1, FIGS. 3 and 4 are a block diagram of that portion of one embodiment of the present invention located at the receiving point, FIG. 5 shows the manner in which FIGS. 3 and 4 are to be associated, FIG. 6 is a detailed showing of a correlator, such as used in FIG. 3, and FIG. 7 is a detailed showing of the decision circuit of FIG. 4.

From the foregoing general discussion of the present invention, it will be seen that any one of a multitude of possible codes of orthogonal function may be chosen. In order to simplify the present disclosure, and solely for illustrative purposes, it will be assumed that a "real" alphabet of thirty-two teletype characters is to be manifested by the following relatively simple three-channel 2,2,0 code:

*Three-Channel 2,2,0 Code*

| | Channel 1 | Channel 2 | Channel 3 |
|---|---|---|---|
| 0 | SC | SC | 0 |
| 1 | SC | −S−C | 0 |
| 2 | −S−C | SC | 0 |
| 3 | −S−C | −S−C | 0 |
| 4 | S−C | S−C | 0 |
| 5 | −SC | −SC | 0 |
| 6 | S−C | −SC | 0 |
| 7 | −SC | S−C | 0 |
| 8 | SC | S−C | 0 |
| 9 | SC | −SC | 0 |
| 10 | −S−C | S−C | 0 |
| 11 | −S−C | −SC | 0 |
| 12 | −SC | SC | 0 |
| 13 | S−C | SC | 0 |
| 14 | −SC | −S−C | 0 |
| 15 | S−C | −S−C | 0 |
| 16 | SC | 0 | SC |
| 17 | SC | 0 | −S−C |
| 18 | −S−C | 0 | SC |
| 19 | −S−C | 0 | −S−C |
| 20 | S−C | 0 | S−C |
| 21 | −SC | 0 | −SC |
| 22 | S−C | 0 | −SC |
| 23 | −SC | 0 | S−C |
| 24 | 0 | SC | SC |
| 25 | 0 | SC | −S−C |
| 26 | 0 | −S−C | SC |
| 27 | 0 | −S−C | −S−C |
| 28 | 0 | −SC | −SC |
| 29 | 0 | S−C | S−C |
| 30 | 0 | −SC | S−C |
| 31 | 0 | S−C | −SC |

It will further be assumed, solely for illustrative purposes, that characters are to be transmitted serially at a rate of 6 c.p.s.

Referring now to FIG. 1, there is shown oscillator 100 operating at a frequency of $f_0$, which may be 2400 c.p.s., for example. The frequency output $f_0$ of oscillator 100 is applied to frequency divider and mixer means 102, which divides the frequency $f_0$ into a given sub-harmonic of $f_0$, such as 6 c.p.s. in the above example, and second and third harmonics of this given sub-harmonic, such as 12 c.p.s. and 18 c.p.s., respectively. Each of these three frequencies is then added by the mixer means of frequency divider and mixer means 102 to frequency $f_0$ to obtain frequencies $f_1$, $f_2$, and $f_3$, respectively. It will be seen that $f_1$ is equal to 2406 c.p.s., $f_2$ is equal to 2412 c.p.s., and $f_3$ is equal to 2418 c.p.s., under the assumed conditions. Thus, the frequency difference $\Delta f$ between $f_2$ and $f_1$, and between $f_3$ and $f_2$, respectively, is 6 c.p.s.

Frequency $f_1$ is applied as an input to phase shifter 104*a* which provides as an output therefrom four separate 90° phase-displaced signals designated, respectively, sin $f_1$, —sin $f_1$, cos $f_1$, and —cos $f_1$. In a similar manner, frequencies $f_2$ and $f_3$ are applied as respective inputs to phase shifters 104*b* and 104*c* to provide, as shown, respective outputs sin $f_2$, —sin $f_2$, cos $f_2$, —cos $f_2$, sin $f_3$, —sin $f_3$, cos $f_3$, and —cos $f_3$.

Each of the outputs of phase shifters 104*a*, 104*b*, and 104*c* is applied, as shown, as an individual input to signal encoder 106. In addition, the output sin $f_1$ of phase shifter 104*a* is applied as an input to pulse generator 108, which, in response thereto, produces a short pulse at the beginning of every four hundred and one cycles of sin $f_1$, i.e., every one-sixth of a second. Pulse generator 108, for instance, may consist of a counter for counting four hundred cycles of sin $f_1$ and in response thereto enabling normally disabled means for producing a pulse in response to the initiation of the next cycle of sin $f_1$, the occurrence of a pulse then resetting the counter.

In any event, the pulse output of pulse generator 108, which occurs every one-sixth of a second, is applied as a synchronizing input to tape reader 110. The application of a pulse from pulse generator 102 to tape reader 110 initiates a cycle of operation of tape reader 110, which operates in a well known manner, to mark with potential a unique combination of five output conductors thereof in accordance with a character on a perforated tape. There are thirty-two separate combinations in which the five output conductors of tape reader 110 may be marked. This marking remains on the output conductors of tape reader 110 for the most part of the one-sixth of a second interval, and is then removed and the perforated tape of tape reader 110 is advanced to the next character and then awaits the next synchronizing pulse from pulse generator 108.

As shown, the output conductors of tape reader 110 are applied as an input to signal encoder 106. Signal encoder 106, in accordance with the particular markings on the output conductors of tape reader 110 applied thereto, selects the appropriate four input signals from phase shifters 104*a*, 104*b*, and 104*c* in accordance with the above-listed code and applies these four signals in parallel as the output from signal encoder 106.

Referring now to FIG. 2, where signal encoder 106 is shown in detail, the five output conductors from tape reader 110 are applied to matrix 200, which may be a diode matrix, a relay tree, etc. In accordance with the particular markings on the five output conductors of tape reader 110, matrix 200 causes a potential marking to be applied to a single one of the thirty-two conductors emanating therefrom. Each of the thirty-two conductors conductors emanating from matrix 200 is connected to a separate AND gate to enable that AND gate to which it is connected to pass those orthogonal functions applied thereto only when a marking is present thereon. In order to simplify the drawing, only AND gate 0 and AND gate 31 are shown in detail. As shown, in accordance with the above-listed code, AND gate 0 has applied as signal inputs thereto sin $f_1$, cos $f_1$, sin $f_2$, and cos $f_2$, and AND gate 31 has applied as signal inputs thereto sin $f_2$, —cos $f_2$, —sin $f_3$, and cos $f_3$. As shown, the outputs of the several AND gates are all connected in parallel, but, as set forth above, only a single AND gate will be operating at any given time, since only a single one of the thirty-two conductors emanating from matrix 200 has a marking thereon. Thus, if AND gate 0 is conducting, the output of encoder 106 will include only sin $f_1$, cos $f_1$, sin $f_2$, and cos $f_2$. If AND gate 31 is conducting, the output from signal encoder 106 will include only sin $f_2$, —cos $f_2$, —sin $f_3$, and cos $f_3$.

Referring again to FIG. 1, the output of signal encoder 106 is applied as an input to transmitter 112. Also applied as an input to transmitter 112 in parallel with the output from signal encoder 106 is frequency $f_0$, which is applied directly from oscillator 100. If the information is to be transmitted by a radio link, transmitter 112 consists of a carrier frequency which is modulated by the input thereto as well as the transmitting antenna. If wire communication is to be utilized to transmit information to the receiving point, transmitter 112 includes an amplifier, if necessary, and means for matching the transmission line. In some cases, where wire communication is utilized, the input to transmitter 112 may be applied directly to the transmission line and transmitter 112 may be omitted.

Referring now to FIGS. 3 and 4, the information received from the transmitter is applied as an input to receiver 300. If the information has been transmitted over a radio link, receiver 300 is a radio receiver for demodulating the received modulated carrier signal. If wire communication has been employed to transmit the signal from the transmitting point to the receiving point, receiver 300 may include means for matching the transmission line and an amplifier, if necessary. In some cases where wire communication is employed, receiver 300 may be omitted entirely.

In any event, assuming there has been no error introduced in transmitting the information from the transmitting point to the receiving point, the output of receiver 300 consists exactly of the same signals which were applied as an input to transmitter 112.

The output from receiver 300 is applied as an input to sharply tuned bandpass filter 302, which permits only frequency $f_0$ to be passed. Frequency $f_0$, appearing at the output of filter 302, is applied as an input to phase-locked oscillator 304, which, under the assumed conditions, also operates at a frequency of 2400 c.p.s. Thus, synchronism is maintained between phase-locked oscillator 304 at the receiving point and oscillator 100 at the transmitting point by the frequency $f_0$ which is transmitted to the receiving point and is used to phase lock phase-locked oscillator 304.

The output from phase-locked oscillator 304 is applied as an input to frequency divider and mixer means 306, which is identical in structure and function to frequency divider and mixer means 102 at the transmitting point. Frequency divider and mixer means 306 provides as respective outputs therefrom frequencies $f_1$, $f_2$, and $f_3$, which, under the assumed conditions, are 2406 c.p.s., 2412 c.p.s., and 2418 c.p.s., respectively.

Frequency $f_1$ is applied as an input to phase shifter 308*c*, frequency $f_2$ is applied as an input to phase shifter 308*b*, and frequency $f_3$ is applied as an input to phase shifter 308*a*.

Phase shifter 308*c* provides as respective outputs therefrom two 90° phase-displaced signals, sin $f_1$ and cos $f_1$, respectively. Similarly, phase shifter 308*b* provides signals sin $f_2$ and cos $f_2$, respectively, and phase shifter 308*a* provides signals sin $f_3$ and cos $f_3$, respectively.

The output from receiver 300, in addition to being applied to filter 302, is applied, as shown, as a first input to each of correlators 310*a*, 310*b*, 310*c*, 310*d*, 310*e*, and 310*f*.

Sin $f_1$ from phase shifter 308*c* is applied as a second input to correlator 301*a*, cos $f_1$ from phase shifter 308*c* is applied as a second input to correlator 310*b*, sin $f_2$ from phase shifter 308*b* is applied as a second input to correlator 310*c*, cos $f_2$ from phase shifter 308*b* is applied as a second input to correlator 310*d*, sin $f_3$ from phase shifter 308*a* is applied as a second input to correlator 310*e*, and cos $f_3$ from phase shifter 308*a* is applied as a second input to correlator 310*f*.

Referring for a moment to FIG. 6, which shows a schematic circuit diagram of a correlator, it will be seen that a correlator is composed of a multiplier and an integrator. As shown, the mutiplier consists of a balance diode ring modulator, comprising center tapped transformer 600, for applying the first input thereto, transformer 602, for applying the second input thereto, ring-connected diodes 604*a*, 604*b*, 604*c*, and 604*d*, and output resistances 606*a* and 606*b*. The multiplier is identical to a conventional balanced diode ring modulator, except for the fact that the output is taken across a resistance load, rather than a conventional center tapped transformer load. This is necessary because the D.C. component, which is essential to the operation of the correlator, would be lost across an output transformer load.

The output across resistances 606*a* and 606*b*, which is substantially proportional to the product of input I and input II, is applied as an input to a conventional integrator comprising serially-connected resistance 608 and capacitance 610. If desired, in order to avoid the loading effect on the multiplier of serially-connected resistance 608 and capacitance 610, a D.C. integrating amplifier may be substituted therefor. In any event, the magnitude of the output across capacitance 610, or the output of the D.C. integrating amplifier, as the case may be, manifests an analog of the integral of the product of input I and input II.

It will be seen from the above discussion of Equations 2–6 that the output from correlator 310*a* will be a D.C. voltage having a polarity indicative of whether the received signal includes a sin $f_1$ or —sin $f_1$ component and a magnitude proportional to the amplitude of this component. In a similar manner, the respective polarities and magnitudes of the D.C. voltages obtained as outputs from correlators 610*b* to 610*f*, respectively, determine the respective amplitudes of the components $\pm\cos f_1$, $\pm\sin f_2$, $\pm\cos f_2$, $\pm\sin f_3$, and $\pm\cos f_3$ included in the received signal. If a particular component is absent in the received signal, the output from the corresponding correlator will be zero.

Returning now to FIGS. 3 and 4, the $\sin f_1$ output from phase shifter 308*c*, in addition to being applied as a second input to correlator 310*a*, is also applied as an input to pulse generator 400. Pulse generator 400, which is identical in structure and function to pulse generator 108 at the transmitting point, generates a short pulse periodically at time intervals T, equal to $$\frac{1}{\Delta f}$$

i.e., every one-sixth of a second under the assumed conditions.

The pulse output from pulse generator 400 is applied to relay 410 to effect the operation of relay 410 for the duration of each pulse, relay 410 being restored at the end of a pulse and remaining restored until the beginning of the next pulse from pulse generator 400.

Relay 410 is equipped with normally open contacts 410*a*, 410*b*, 410*c*, 410*d*, 410*e*, 410*f*, and 410*s*, respectively.

As shown, in response to the closure of contacts 410*s*, operating potential is applied to relay 412, causing relay 412 to operate. Relay 412 does not operate instantaneously upon the application of operating potential thereto, but takes a short time to operate, such as about ten milliseconds.

As shown, relay 412 is equipped with six transfer contacts comprising normally closed contacts 412*a*1, 412*b*1, 412*c*1, 412*d*1, 412*e*1, 412*f*1, and normally open contacts 412*a*2, 412*b*2, 412*c*2, 412*d*2, 412*e*2, and 412*f*2.

As shown, during the period after relay 410 has operated and before relay 412 has operated, the output from correlator 310*a* is applied through operated contacts 410*a* and normally closed contacts 412*a*1 to one terminal of positively poled diode 413*a*1 and to one terminal of negatively poled diode 413*a*2. In a similar manner, the outputs of each of correlators 310*b*–310*f* are applied through corresponding contacts of relays 410 and 412, respectively, to one terminal of positively poled diodes 413*b*1, 413*c*1, 413*d*1, 413*e*1, 413*f*1, respectively, and one terminal of negatively poled diodes 413*b*2, 413*c*2, 413*d*2, 413*e*2, and 413*f*2.

As shown in FIG. 4, there are thirty-two summers, 414–0 through 414–31, respectively, only the first and last two of which are specifically shown. Each of these summers is composed of a D.C. summing amplifier for summing four inputs applied thereto to obtain an output therefrom having a given polarity, which is assumed to be positive, and a magnitude proportional to the absolute value of the sum of the four inputs applied thereto.

Referring to the above-listed code, the other terminal of positively poled diode 413*a* is connected as one input to all those respective ones of summers 414–0 to 414–31, which includes $\sin f_1$ as a component thereof. In a similar manner, each of the other terminals of diodes 413*a*2–413*f*2 which represent, respectively, $-\sin f_1$, $-\cos f_1$, $-\sin f_2$, $-\cos f_2$, $-\sin f_3$ and $-\cos f_3$, and each of the other terminals of diodes 413*b*1–413*f*1, which represent, respectively, $\cos f_1$, $\sin f_2$, $\cos f_2$, $\sin f_3$, and $\cos f_3$, is connected to the appropriate ones of summers 414–0 to 414–31 in accordance with the above-listed code.

As shown, each of the outputs of summers 414–0 to 414–31 is applied as an individual input to decision network 416 and corresponding individual outputs of decision circuit 416 are applied to a teleprinter, not shown.

Referring now to FIG. 7, which shows decision circuit 416 in detail, there is shown the first and last two of the individual inputs thereto from summers 414–0 to 414–31. As set forth above, each of these inputs has a given polarity, which is assumed to be positive, and a magnitude proportional to the absolute magnitude of the four inputs to the summer from which it emanates. As shown in FIG. 7, each individual input thereto is connected in series through a positively poled diode, such as diodes 700–0, 700–1, . . . 700–30, and 700–31, and through a relay, such as 702–0, 702–1, . . . 702–30 and 702–31, to a common conductor which is connected to ground through relatively high resistance 704.

Each of these relays includes normally open contacts, such as 702–0*a*, 702–1*a*, . . . 702–30*a*, and 702–31*a*, each of which is effective when operated in connecting battery potential from battery 706 to a corresponding individual output conductor which is connected to a teleprinter.

The absolute magnitude of the input signal applied to some one of the thirty-two input conductors from these summers will be higher than all the rest. This one input signal will cause a current proportional to the magnitude thereof to pass through its associated diode and relay and through common resistance 704. Since the forward resistance of the diode and the relay is negligible compared to the resistance of resistance 704, a bias potential will be derived across resistance 704 which is substantially equal in magnitude to that of this one input signal. This bias potential will be sufficient to back bias the diodes of all the other lower magnitude input signals, so that no current will pass through any of the relays individually associated with any of these lower magnitude input signals. Thus, only the relay associated with the highest magnitude input signal will operate, and battery potential from battery 706 will be applied to only the output conductor associated with the highest magnitude input signal.

For instance, assume that the magnitude of the input signal applied to input conductor 1 is 1.5 volts, and that the respective magnitudes of the input signals applied to input conductor 0 and input conductors 2–31 range between 0 and 1.4 volts, so that the magnitude of the input signal applied to conductor 1 is higher than the magnitude of any of the other input signals. Under these assumptions, current will flow through diodes 700–1 and relay 702–1 and through common resistance 704, causing a voltage drop across resistance 704 which is substantially equal to 1.5 volts, since the voltage drop across diode 700–1 and relay 702–1 is negligible. This 1.5 volts across resistance 704 will back bias each of diodes 700–0 and 700–2 to 700–31, so that no current will flow therethrough. However, the current through relay 702–1 will cause relay 702–1 to operate, closing normally open contacts 702–1*a* thereof. Therefore, battery voltage from battery 706 will, in this case, be applied to output conductor 1 which extends to the teleprinter. In response to a potential marking being applied to any of output conductors 0 to 31, the teleprinter will print a particular character or perform some particular function, such as spacing, carriage return, etc. Therefore, in response to battery potential from battery 706 being applied to output conductor 1, the teleprinter will print that character or perform that function which is individually associated with a potential marking being present on output conductor 1.

In utilizing the above-listed code, each transmitted character includes five components, namely, frequency $f_0$, which is transmitted merely for the purpose of phase locking phase-locked oscillator 304, and some four out of the twelve components $\sin f_1$, $-\sin f_1$, $\cos f_1$, $-\cos f_1$, $\sin f_2$, $-\sin f_2$, $\cos f_2$, $-\cos f_2$, $\sin f_3$, $-\sin f_3$, $\cos f_3$, and $-\cos f_3$, which are selected by signal encoder 106 in accordance with the character read by tape reader 110 and the above-listed code. Considering for the moment the make-up of the above-listed code, it will be seen that no character may include as components thereof both the sine and —sine of the same frequency, since the sine and —sine of the same frequency would cancel each other. For the same reason, the cosine and —cosine of the same frequency cannot be used in the code.

The above-listed code was designed so that all "single" errors and five-twelfths of all "double" errors occurring in transmission would be recognized and corrected by decision network 416. A "single" error exists when one of the four components in a character is phase displaced no more than 90° with respect to the other components during transmission, so that a transmitted sine or —sine function of a frequency looks either more like a cosine or a —cosine function of that frequency at the receiver than it looks like the function actually transmitted, or a cosine or a —cosine function looks more like a sine or —sine function at the receiver than the function actually transmitted. A "single" error also exists when the received magnitude of one of the transmitted components is less than the received magnitude of a component which was not transmitted at all. Thus, for instance, if the character 0 was transmitted, which, according to the above-listed code, is composed of the components sin $f_1$, cos $f_1$, sin $f_2$, and cos $f_2$, and due to error in transmission at the receiving point sin $f_1$, cos $f_1$, sin $f_2$, cos $f_2$, and sin $f_3$ were received, and sin $f_3$ was greater in magnitude than sin $f_1$, a "single" error would exist.

A "double" error exists when either two of the four components are each shifted 90° in phase during transmission, or one component is shifted 180° in phase during transmission, or the received magnitudes of two functions which were not transmitted at all is greater than the received magnitudes of two functions which were transmitted.

The reason why errors are detected and corrected is a consequence of the operation of decision network 416, described above. As long as a received character which has been garbled during transmission looks more like the character which was actually transmitted than it looks like any of the other characters in the above-listed code, the magnitude of the output from the summer individual to that character will be greater than the magnitudes of the outputs from any of the other summers. Therefore, in the manner previously described, the relay of decision circuit 416, shown in FIG. 7, individual to that summer, will be the only relay operated. However, if a transmitted character has been garbled to the point where the received character looks more like some other character in the above-listed code, the relay of decision circuit 416 individual to this other character will be operated. Thus, decision network 416 will in effect decide that this other character has been transmitted.

In order to minimize error, the three-channel 2,2,0 code listed above has been made up so that each character therein bears as little resemblance to any other character therein as is possible within the confines of a three-channel code capable of transmitting thirty-two different characters.

It will be noted that the total frequency bandwidth needed to transmit a thirty-two alphabet code at the rate of six characters per second utilizing the above-listed three-channel 2,2,0 code, and including the phase locking synchronizing signal $f_0$, is only 18 c.p.s., i.e., $f_0$ is 2400 c.p.s., $f_1$ is 2406 c.p.s., $f_2$ is 2412 c.p.s., and $f_3$ is 2418 c.p.s., so that the difference between $f_3$ and $f_0$ is 18 c.p.s.

As stated above, this code is capable of detecting and correcting all "single" errors and five-twelfths of all "double" errors.

If greater error-minimizing capability is desired, the following somewhat more complex code, which corrects all "double" errors as well as all "single" errors, may be utilized:

*5 Out of 8 Double Error Correction Alphabet*

| | $F_1$ | $F_2$ | $F_3$ | $F_4$ |
|---|---|---|---|---|
| 1 | SC | S | S | S |
| 2 | −S−C | −S | −S | −S |
| 3 | S | S | −S | SC |
| 4 | −C | −S | S | −S−C |
| 5 | −SC | S | -------- | −S−C |
| 6 | S−C | S | -------- | −SC |
| 7 | −SC | -------- | S | SC |
| 8 | S−C | -------- | −S | −S−C |
| 9 | -------- | SC | SC | C |
| 10 | -------- | −S−C | −S−C | −C |
| 11 | −S | S−C | SC | -------- |
| 12 | S | −SC | −S−C | -------- |
| 13 | S−C | C | -------- | SC |
| 14 | −SC | −C | -------- | −S−C |
| 15 | S | S−C | C | C |
| 16 | −S | −SC | −C | −C |
| 17 | −C | −C | −SC | S |
| 18 | C | C | S−C | −S |
| 19 | −S−C | C | −C | C |
| 20 | SC | −C | C | −C |
| 21 | C | −SC | SC | -------- |
| 22 | −C | S−C | −S−C | -------- |
| 23 | -------- | −S−C | SC | S |
| 24 | -------- | SC | −S−C | −S |
| 25 | −S−C | C | C | −C |
| 26 | SC | C | −C | C |
| 27 | S | S | S | −S−C |
| 28 | −S | −S | −S | SC |
| 29 | −SC | -------- | C | −SC |
| 30 | S−C | -------- | −C | S−C |
| 31 | C | C | S−C | −C |
| 32 | −C | −C | S−C | C |

It will be seen that is more complex code utilizes one more frequency channel than the aforesaid 2,2,0 code, Thus, a total bandwidth of 24 c.p.s., i.e,, from 2400 c.p.s. to 2424 c.p.s., rather than 18 c.p.s., is needed for this more complex code.

Furthermore, an embodiment of the invention to accommodate this more complex code would be somewhat more complex. For instance, each of the AND gates, shown in FIG. 2, would have to accommodate five, rather than four, input signals; four, rather than three, phase shifters at both the transmitting point and receiving point would have to be utilized; eight, rather than six, correlators would have to be employed; and each of the summers would have to accommodate five, rather than four, inputs. However, if error-minimizing capability is important, this is a small price to pay.

To achieve even more error-minimizing capability and/or a larger "real" alphabet than thirty-two characters, even more complex codes may be developed. In making up any code, in order to achieve the best error-minimizing capabilities, the "available" alphabet should be large with respect to the needed "real" alphabet, i.e., the number of actual characters should be a relatively small proportion of all the possible permutations of the available orthogonal functions, and further the code manifesting each character should be chosen to be as different from the respective codes manifesting each of the other characters as is possible within the confines of the "available" alphabet.

Therefore, although one embodiment of the present invention has been described in detail herein, it is apparent that many modifications within the skill of the art, such as the use of a different orthogonal function code, may be made. For this reason, it is not intended that the invention be restricted to the embodiment which has been described in detail only for the purposes of illustration, but that it be limited only by the true spirit and scope of the appended claims.

What is claimed is:

1. A communications system comprising first means for generating a given plurality of different orthogonal function analog signals, second means coupled to said first means and having any particular one of a predetermined number of information-manifesting signals applied thereto for simultaneously selecting a unique combination of some of said orthogonal function analog signals in accordance with a preselected code, transmitting means for transmitting said selected combination to a receiving point, and third means at said receiving point for decoding said selected combination as received in accordance with said preselected code to determine the information manifested thereby.

2. The communications system defined in claim 1, wherein said second means includes fourth means for connecting the orthogonal function analog signals of said selected combination in parallel with each other.

3. The communications system defined in claim 1, wherein there exist more possible unique combinations of some of said orthogonal function analog signals than said predetermined number of information-manifesting signals, wherein said preselected code is chosen to minimize the resemblance between the unique combination of orthogonal function analog signals preselected to represent any one of said information-manifesting signals and the respective unique combinations of orthogonal function analog signals preselected to represent each of the remaining information-manifesting signals, and wherein said third means includes correlating means for correlating said selected combination as received with each of the preselected unique combinations of said code, and decision means coupled to said correlating means for determining the information manifested by said selected combination from that preselected unique combination of the code which bears the highest correlation with said selected combination as received.

4. A communications system for transmitting information from a transmitting point to a receiving point at a predetermined frequency, said system comprising at said transmitting point first means for generating 90° phase-displaced sinusoidal signals at each of a given plurality of different frequencies, the difference between any two of said different frequencies being equal to a positive integer times said predetermined frequency, pulse generator means coupled to said first means for generating pulses at said predetermined frequency, second means coupled to said first means and having any particular one of a predetermined number of information-manifesting signals applied thereto for simultaneously selecting a unique combination of some of said sinusoidal signals in accordance with a preselected code, third means coupled to said pulse generating means and said second means for applying an information-manifesting signal to said second means in response to each successive pulse from said pulse generating means, and transmitting means for transmitting said selected combination to said receiving point, said system comprising at said receiving point fourth means for decoding said selected combination as received in accordance with said preselected code to determine the information manifested thereby.

5. The communications system defined in claim 4, wherein said preselected code is a phase permuted code.

6. The communications system defined in claim 5, wherein there exist more possible unique combinations of said phase permuted code than said predetermined number of information manifesting signals, wherein said preselected code is chosen to minimize the resemblance between the unique combination of said phase permuted code preselected to represent any one of said information-manifesting signals and the respective unique combinations of said phase permuted code preselected to represent each of the remaining information-manifesting signals, and wherein said fourth means includes correlating means for correlating said selected combination as received with each of the preselected unique combinations of said phase permuted code, and decision means coupled to said correlating means for determing the information manifested by said selected combination from that preselected unique combination of said phase permuted code which bears the highest correlation with said selected combination as received.

7. The combination defined in claim 4, wherein said first means includes an oscillator producing a given frequency signal, fifth means coupled to said oscillator for deriving from said given frequency signal respective signals at each of said different frequencies, and phase shift means for each of said respective signals coupled to said fifth means for deriving from each of said respective signals said 90° phase-displaced sinusoidal signals, at least one of said frequency signals being applied to said pulse generating means for controlling the generation of pulses at said predetermined frequency.

8. The combination defined in claim 7, wherein said given frequency is a given harmonic of said predetermined frequency, and wherein the frequencies of each of said respective signals differs from said given frequency by an integral multiple of said predetermined frequency.

9. The combination defined in claim 7, wherein adjacent ones of said respective signals differs in frequency from each other by said predetermined frequency.

10. The combination defined in claim 7, wherein the respective phases of said 90° phase-displaced sinusoidal signals are 0°, 90°, 180°, and 270°.

11. The combination defined in claim 7, including sixth means for applying said given frequency signal to said transmitting means, and wherein said fourth means includes a phase-locked oscillator producing a signal at said given frequency, seventh means for applying said given frequency signal as received to said phase-locked oscillator for phase locking said phase-locked oscillator therewith, eighth means corresponding to said fifth means coupled to said phase-locked oscillator for deriving respective signals at each of said different frequencies, second phase shift means for each of said respective signals from said eighth means coupled to said eighth means for deriving 90° phase-displaced sinusoidal signals corresponding in phase with at least some of said sinusoidal signals derived by said first-mentioned phase shift means and 180° out of phase with the remaining of said sinusoidal signals derived by said first-mentioned phase shift means, a plurality of correlators corresponding in number to the number of sinusoidal signals from said eighth means, ninth means for applying said selected combination as received as a first input signal to each of said correlators, tenth means for individually applying each of said sinusoidal signals from said eighth means as a second input signal to its corresponding correlator, individual summing circuit means corresponding to each unique combination of said preselected code, second pulse generating means controlled by at least one of said frequency signals of said fourth means for generating short pulses at said predetermined frequency which occur substantially isochronously with pulses of said first-mentioned pulse generating means, polarity-sensitive means coupled to said second pulse generating means, said correlators and said summing circuit means for sampling the output signals of said correlators during a first portion of each pulse and in accordance with the polarity of each respective correlator output signal applying that output signal as a separate input signal to only those summing circuit means which correspond to unique combinations having as a component thereof the particular sinusoidal signal manifested by that correlator and the polarity of the output signal thereof, and during the remaining portion of said pulse resetting said correlators, the output signal from each of said summing circuit means being proportional in magnitude to the absolute sum of the respective magnitude of the input signals thereto, and a decision circuit means having the respective outputs of said summing circuit means applied thereto, said decision circuit means having respective output means corresponding to each summing circuit means, said decision circuit means producing an output signal only on that output means thereof which corresponds to that summing circuit means output signal which has a magnitude greater than all the other summing circuit means output signals.

12. The combination defined in claim 11, wherein said decision circuit means includes a separate current operated switch means for each summing circuit means, respective forwardly poled diodes for simultaneously individually applying the output signal of each summing circuit means to its switch means, and a common relatively high resistance serially connected to all said switch means, whereby current from that summing circuit means output signal which has a magnitude greater than all the other summing circuit means output signals causes the switch means associated therewith to operate and develops a potential across said common resistance sufficient to back bias the diodes associated with all said other summing circuit means, and means responsive to an operated switch means for applying an electrical marking to the output means individually associated therewith.

13. A decoder for a preselected code composed of a predetermined number of unique combinations of some of a given plurality of distinct signals, wherein all the possible unique combinations of some of said given plurality of said distinct signals is larger than said predetermined number, and wherein each unique combination of said code is preselected to minimize the resemblance thereof with the respective other unique combinations of said code, said decoder comprising first means having any one of said possible unique combinations of distinct signals received thereby for segregating the distinct signals of which said received unique combination is composed and producing separate output signals for each of said given plurality of distinct signals having respective absolute magnitudes which is a function of the magnitude of that distinct signal present in said received unique combination, and individual second means corresponding to each preselected unique combination of said code, third means for applying each respective output signal of said first means as a separate input signal to only those of said second means which correspond to unique combinations of said code which include the distinct signal manifested by that separate output signal of said first means, the output signal of each of said second means having a magnitude which is a given function of the combined magnitudes of the separate input signals thereto, and a decision circuit means to which the respective output signals of said second means are applied, said decision circuit means being responsive to the relative magnitudes of the respective output signals of said second means to produce an output signal therefrom indicative of which one of the unique combinations of said preselected code said received unique combination most closely resembles.

14. The decoder defined in claim 13, wherein each second means is a summing circuit means, said given function being the sum of the absolute magnitudes of the separate input signals to a summing circuit means, and wherein said decision circuit means produces an output signal therefrom indicative of which respective summing circuit means output signal has the greatest absolute magnitude.

15. The decoder defined in claim 14 wherein said decision circuit means includes a separate current operated switch means for each summing circuit means, respective forwardly poled diodes for simultaneously individually applying the output signal of each summing circuit means to its switch means, and a common relatively high resistance serially connected to all said switch means, whereby current from that summing circuit means output signal which has a magnitude greater than all the other summing circuit means output signals causes the switch means associated therewith to operate and develops a potential across said common resistance sufficient to back bias the diodes associated with all said other summing circuit means, respective output conductors associated individually with each of said switch means, and means responsive to an operated switch means for applying an electrical marking only to the output conductor individually associated with said operated switch means.

16. A decoder for a code composed of a predetermined number of unique signals, said decoder comprising receiving means for deriving a received signal, correlating means coupled to said receiving means responsive to a received signal applied thereto for producing a plurality of output signals equal in number to said predetermined number, each of said output signals manifesting the degree of correlation between said received signal and a separate particular one of said unique signals, and a decision circuit means coupled to the output of said correlating means for producing an output signal therefrom indicative of which output signal from said correlating means manifests the greatest degree of correlation of all the output signals from said correlating means.

17. A circuit responsive to the respective magnitudes of a predetermined number of separate signals simultaneously applied as individual input signals thereto for producing an output indicative of which one of said signals has the greatest magnitude of all said signals, said circuit comprising a separate current operated switch means for each respective input signal, respective forwardly poled diodes for simultaneously individually applying each respective input signal to its switch means, and a common relatively high impedance serially-connected to all said switch means, whereby current from that signal which has a magnitude greater than the respective magnitudes of all the other signals causes the switch means associated therewith to operate and develops a potential across said impedance sufficient to back bias the diodes associated with all said other signals, respective output conductors associated individually with each of said switch means, and means responsive to an operated switch means for applying an electrical marking only to the output conductor individually associated with said operated switch means.

18. The circuit defined in claim 17, wherein said impedance is a resistance.

References Cited in the file of this patent

UNITED STATES PATENTS

| | | |
|---|---|---|
| 2,774,813 | Livingston | Dec. 18, 1956 |
| 2,801,405 | Oliwa | July 30, 1957 |
| 2,866,161 | Davidoff | Dec. 23, 1958 |
| 2,875,270 | Wendt | Feb. 24, 1959 |
| 2,977,417 | Doelz | Mar. 28, 1961 |